(12) United States Patent
Schiffmann

(10) Patent No.: US 7,016,782 B2
(45) Date of Patent: *Mar. 21, 2006

(54) COLLISION DETECTION SYSTEM AND METHOD OF ESTIMATING MISS DISTANCE

(75) Inventor: Jan K. Schiffmann, Newbury Park, CA (US)

(73) Assignee: Delphi Technologies, Inc., Troy, MI (US)

( * ) Notice: Subject to any disclaimer, the term of this patent is extended or adjusted under 35 U.S.C. 154(b) by 470 days.

This patent is subject to a terminal disclaimer.

(21) Appl. No.: 10/158,550

(22) Filed: May 30, 2002

(65) Prior Publication Data

US 2003/0225517 A1 Dec. 4, 2003

(51) Int. Cl.
*G08G 1/16* (2006.01)

(52) U.S. Cl. .................. 701/301; 342/70; 342/455; 340/903

(58) Field of Classification Search ............... 701/301, 701/302; 340/901, 903, 425.5, 435, 436; 342/29, 70
See application file for complete search history.

(56) References Cited

U.S. PATENT DOCUMENTS

| | | | |
|---|---|---|---|
| 5,249,157 A | 9/1993 | Taylor | 340/903 |
| 5,566,074 A * | 10/1996 | Hammer | 701/301 |
| 6,002,974 A | 12/1999 | Schiffmann | 701/36 |
| 6,085,151 A | 7/2000 | Farmer et al. | 701/301 |
| 6,314,366 B1 * | 11/2001 | Farmakis et al. | 701/201 |
| 6,615,138 B1 * | 9/2003 | Schiffmann et al. | 701/301 |
| 2002/0036584 A1 | 3/2002 | Jocoy et al. | 342/70 |

OTHER PUBLICATIONS

Song, T. L., "Observability of Target Tracking with Range–Only Measurements," IEEE Journal Oceanic Engineering, vol. 24, No. 3, Jul. 1999, pp. 383–387.
Reif, K., Günther, S., Yaz, E., "Stochastic Stability of the Discrete–Time Extended Kalman Filter," IEEE Trans. Automatic Control, vol. 44, No. 4, Apr. 1999, pp. 714–728.
Julier, S., Uhlmann, J., "A New Extension of the Kalman Filter to Nonlinear Systems," Proc. Of AeroSense: The 11th Int. Symp. On Aerospace/Defense Sensing, Simulation and Controls, 1997, 12 pages.
De Geeter, J., Van Brussel, H. De Schutter, J., "A Smoothly Constrained Kalman Filter," IEEE Trans. Pattern Analysis and Machine Intelligence, vol. 19, No. 10, Oct. 1997, pp. 1171–1177.
Gordon, J., Salmond, D., Smith, A., "Novel Approach to Nonlinear/Non–Gaussian Bayesian State Estimation," IEE Proceedings–F, vol. 140, No. 2, Apr. 1993, pp. 107–113.
Richards, P., "Constrained Kalman Filtering Using Pseudo–Measurements," IEE Colloquium on Target Tracking, 1995, pp. 75–79.
Massicotte, D., Morawski, R., Barwicz, A., "Incorporation of a Positivity Constraint into a Kalman–Filter–Based Algorithm for Correction of Spectrometric Data," IEEE Trans. Instrumentation and Measurement, vol. 44, No. 1, Feb. 1995.

* cited by examiner

*Primary Examiner*—Yonel Beaulieu
(74) *Attorney, Agent, or Firm*—Stefan V. Chmielewski

(57) ABSTRACT

A collision detection system and method of estimating a miss distance are provided. The collision detection system includes a sensor for sensing an object in a field of view. The sensor measures range and range rate of the object. The collision detection system further includes a controller for estimating a miss distance as a function of the measured range and range rate, without requiring a measured azimuth angle measurement.

34 Claims, 2 Drawing Sheets

US 7,016,782 B2

COLLISION DETECTION SYSTEM AND METHOD OF ESTIMATING MISS DISTANCE

CROSS-REFERENCE TO RELATED APPLICATION

This application is related to U.S. application Ser. No. 10/159,959, filed on the same date, and entitled "COLLISION DETECTION SYSTEM AND METHOD OF ESTIMATING MISS DISTANCE EMPLOYING CURVE FITTING," the entire disclosure of which is hereby incorporated herein by reference.

TECHNICAL FIELD

The present invention generally relates to object collision detection and, more particularly, relates to a vehicle collision detection system and method of estimating the closest point of approach (miss distance) of an object.

BACKGROUND OF THE INVENTION

Automotive vehicles are increasingly being equipped with collision avoidance and warning systems for predicting the potential collision with an external object, such as another vehicle or a pedestrian. Upon detecting a potential collision, such systems typically initiate an action to avoid the collision and/or provide a warning to the vehicle operator. Adaptive cruise control systems have been proposed to track a leading vehicle and automatically control the speed of the following vehicle. The ability to accurately predict an upcoming collision also enables a vehicle controller to control and deploy safety-related devices on the vehicle. For example, upon predicting an anticipated collision or near collision with an object, the vehicle seat belt pretensioner could be activated in a timely manner to pretension the seat belt, thereby enhancing the application of the safety device. The controller could also deploy a warning signal to notify the vehicle driver of a predicted collision with an object.

In conventional vehicle target tracking systems, the host vehicle is generally equipped with a sensor arrangement that acquires range, range rate, and azimuth angle (i.e., direction to target) measurements for each tracked target within a field of view. The sensor arrangement employed in many conventional collision detection systems is generally complex and costly and includes a plurality of radar beams or laser beams covering a field of view. In order to detect an anticipated vehicle collision with an object, the conventional collision detection system generally senses the presence of an object, tracks the movement of the sensed object, and measures the azimuth angle of the object, range to the object, and range rate of the object, all relative to the host vehicle.

The above-mentioned prior known collision detection systems generally require relatively complex and expensive sensor arrangements which use multiple sensors that are required to measure the azimuth angle of the object, relative to the host vehicle, in addition to obtaining the range and range rate measurements. It is generally desirable to reduce the complexity and cost of systems and components employed in automotive vehicles. It is therefore desirable to provide for a vehicle collision detection system which is able to estimate miss distance of an object and predict a potential collision with an approaching object that offers reduced complexity and cost.

SUMMARY OF THE INVENTION

In accordance with the teachings of the present invention, a collision detection system and method of estimating a miss distance of an object are provided. According to one aspect of the present invention, the collision detection system includes a sensor for sensing an object within a field of view. The sensor measures range and range rate of the sensed object. The collision detection system further includes a controller for estimating a miss distance of the object as a function of the measured range and range rate. The controller estimates the miss distance absent an azimuth angle measurement.

According to another aspect of the present invention, a method of estimating a miss distance of an object is provided. The method includes the steps of sensing the presence of an object, tracking the sensed object, measuring range to the object, and measuring range rate of the object. The method further includes the step of estimating a miss distance of the object as a function of the measured range and range rate. The estimate of miss distance is computed absent an azimuth angle measurement.

Accordingly, the collision detection system and miss distance estimation method of the present invention advantageously estimates a miss distance of an object without requiring a complex and costly sensor arrangement, such as those which determine an azimuth angle measurement of the object.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
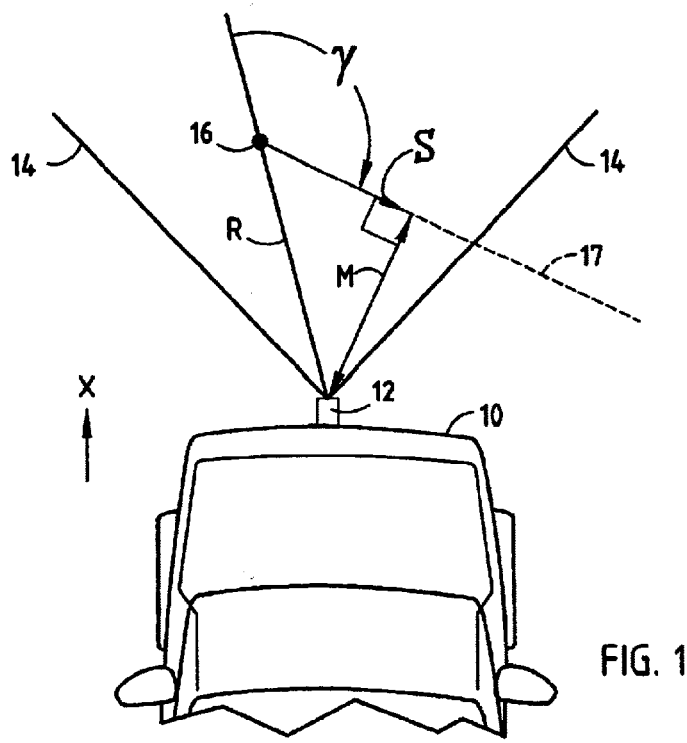
FIG. 1 is a plane view illustrating the geometry of a collision detection system employed on a vehicle according to the present invention.

Referring to FIG. 1, an automotive vehicle 10 is generally illustrated having a collision detection system including a radar sensor 12 mounted thereto to cover a desired field of view 14 in front of the vehicle 10. The vehicle collision detection system senses and tracks one or more objects, such as moving target 16, and estimates a miss distance M for each sensed object. The miss distance M is the closest anticipated distance between the target 16 and the vehicle 10. Using the estimated miss distance M, the collision detection system is able to detect an anticipated collision between the vehicle 10 and the target 16, thereby allowing for responsive action to be taken.

The sensor 12 may include a single sensor or a plurality of sensors arranged to cover the field of view 14 to sense the presence of one or more objects. The sensor 12 also tracks the relative movement of each sensed object within the field of view 14. Sensor 12 measures the range (radial distance) R to the target object 16, and further measures the range rate (time rate of change of radial distance) $\dot{R}$ of the target object 16. The range R is the estimated radial distance between the vehicle 10 and the object 16. Lower case r denotes the measured range output from sensor 12, which may include sensor noise. The range rate Ṙ is the estimated rate of change of the range R of the object as a function of time relative to the vehicle 10. Lower case ṙ denotes the measured range rate output from sensor 12, which may also include sensor noise. Sensor 12 may be a Doppler radar sensor that determines range rate ṙ based on the radar Doppler effect. Sensor 12 may include a commercially available off-the-shelf wide-beam staring microwave Doppler radar sensor. However, it should be appreciated that other object detecting sensors including other types of radar sensors, video imaging cameras, and laser sensors may be employed to detect the presence of an object, track the relative movement of the detected object, and determine the range and range rate measurements r and ṙ that are processed to estimate the miss distance M.

The collision detection system and method of the present invention advantageously determines the miss distance M as a function of the range and range rate measurements r and ṙ, without the requirement of acquiring an angular azimuth measurement of the object. Thus, the collision detection system of the present invention is able to use a reduced complexity and less costly sensing arrangement.

Figure 2:
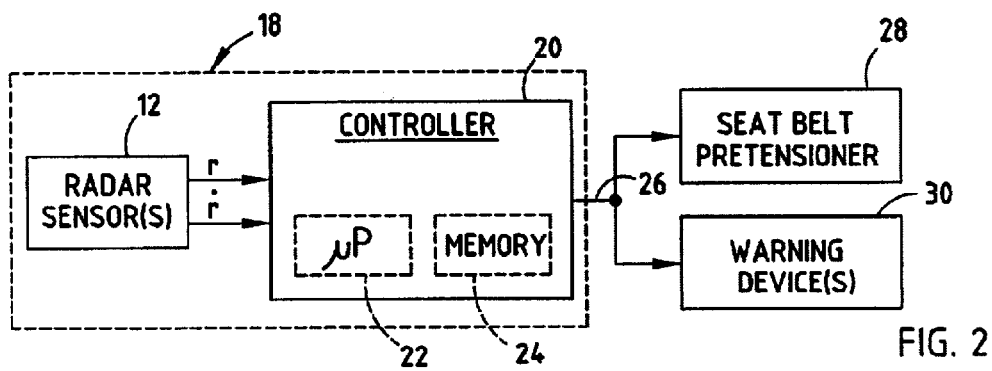
FIG. 2 is a block diagram further illustrating the collision detection system.

Referring to FIG. 2, the collision detection system 18 is shown including radar sensor 12 and a controller 20. Controller 20 preferably includes a microprocessor-based controller having a microprocessor 20 and memory 24. Memory 24 may include random access memory (RAM), read-only memory (ROM), and electrically erasable programmable read-only memory (EEPROM). Controller 20 may be a commercially available off-the-shelf controller and may be dedicated to precrash processing or may share processing capability with other vehicle functions.

The controller 20 receives the range measurement r and range rate measurement ṙ from the radar sensor 12 and processes the received range and range rate measurements r and ṙ with a miss distance estimation and collision detection routine to determine the miss distance M of the target object 16 relative to the host vehicle 10. The collision detection routine may further process the estimated miss distance M to determine whether a potential collision of the object 16 with the vehicle 10 may occur. The controller 20 generates an output signal 26 in the event that an anticipated vehicle collision has been determined. The output signal 26 may be supplied as an input to one or more devices in the vehicle, such as a seat belt pretensioner 28, to activate the device(s) in anticipation of an anticipated upcoming collision. According to the example shown, the seat belt pretensioner 28 may be controlled to pretension the seat belt just prior to the anticipated vehicle collision to eliminate slack in the restraining device. The output signal 26 may be provided to one or more warning devices 30 to warn the vehicle operator and occupants of an anticipated vehicle collision. It should further be appreciated that other devices may be deployed including vehicle air bags, pop-up roll bars, and other safety-related devices.

Figure 3:
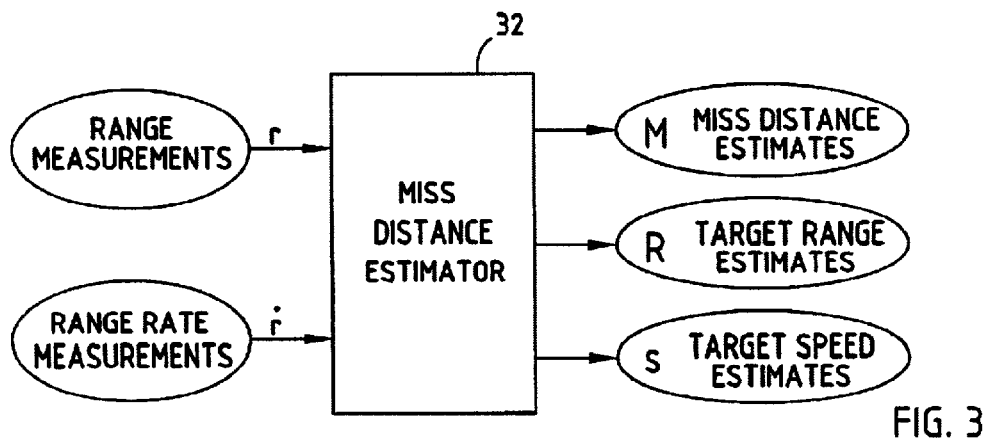
FIG. 3 is a block diagram illustrating a miss distance estimator of the collision detection system.
Figure 4:
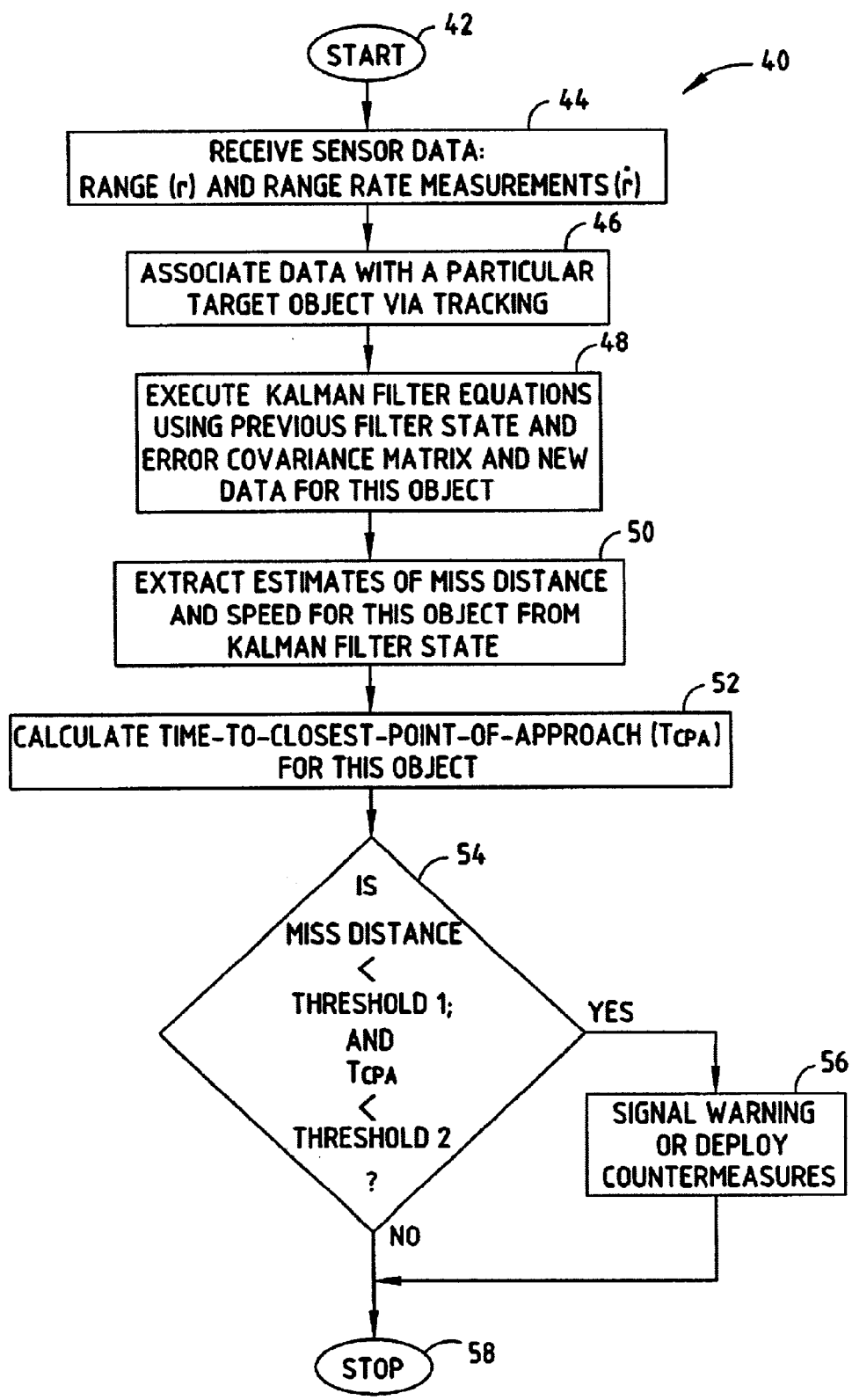
FIG. 4 is a flow diagram illustrating a routine for estimating and using the miss distance in collision detection according to the present invention.

Referring to FIG. 3, a miss distance estimator 32 is generally shown receiving the range measurement r and range rate measurement ṙ, both generated by sensor 12. The range and range rate measurements r and ṙ are processed by the estimator 32, which includes a programmed routine as shown in FIG. 4 and described below, to estimate the miss distance M. In addition, the estimator 32 estimates range R of the target. The estimated range R is filtered to remove noise from the actual range measurement r. Further, the miss distance estimator 32 may also estimate speed S of the target (object). Target speed S may be determined by processing the range R and range rate Ṙ at incremental time instants, i.e., k, k+1, k+2, etc. with a Kalman filter or by solving for speed S in the following equation:

$$R_{k+1}^2 = R_k^2 + 2R_k\dot{R}_k T + S^2 T^2$$

The routine 40 for estimating the miss distance M and determining a collision detection signal 26 is illustrated in FIG. 4. Routine 40 begins at step 42 and proceeds to step 44 to receive the sensor measurement data including the range measurement r and range rate measurement ṙ for each object sensed in the sensor field of view. Next, in step 46, routine 40 associates data with a particular targeted object by way of an object tracker. The object tracker tracks each object based on the combination of range and range rate measurements r and ṙ. If the current range and range rate measurements r and ṙ are sufficiently close in value to the predicted range and range rate values, the object measurement is assumed to pertain to the same object. The tracking of each detected object allows for a consistent stream of measurement data at incremental time periods k, k+1, k+2, etc. for each sensed object.

Proceeding next to step 48, Kalman filter equations are executed using the previous filter state and error covariance matrix and new data for the tracked object. The Kalman filter equations may include non-linear or linear filter techniques for estimating the miss distance M. According to one embodiment, the estimator includes a non-linear filter which may include an extended Kalman filter having a set of state variables, a process model, and a measurement model as explained herein. According to another embodiment, the estimator includes a linear filter which may include a Kalman filter having a set of state variables, a process model, and a measurement model as explained herein.

The estimator 32 generates an output sequence of range, speed, and miss distance estimates in response to an input sequence of range and range rate measurements for a particular targeted object. The estimator estimates miss detection under the assumption that the targeted object is a point reflector (i.e., its physical extent is ignored), and that the target and host vehicle are in rectilinear uniform motion, i.e., they are each moving in a straight line at constant speed. Because of the rectilinear uniform motion assumption for both the host vehicle and targeted object, the host vehicle can be assumed to be stationary in the derivation of mathematical models which will refer to target position and velocity relative to the host vehicle. However, if the host vehicle and target object are not in a rectilinear uniform motion, the miss distance M can still be estimated with a possible small error.

In step 50, routine 40 extracts the estimates of miss distance M and speed S for a target object from the Kalman filter state. The estimated miss distance M represents the closest anticipated point of approach of the object to the vehicle. The speed S of the object is estimated based on the range and range rate measurements at multiple incremental time periods. Given the range rate Ṙ and estimated speed S, the Kalman filter estimates the miss angle γ. The miss angle γ is the angle between a line radially extending from the vehicle 10 to the object 16 and a line 17 in the direction of movement of the object 16. The miss angle γ is limited to a restricted range of zero to one hundred eighty degrees (0 to 180°), due to the unknown direction of lateral movement (left or right) of the object relative to the vehicle 10. The miss angle γ can alternately be estimated based on the following function $$\gamma = \arccos\left(\frac{\dot{R}}{S}\right).$$

The miss distance M is estimated as a function of the range and the miss angle γ according to the following equation: M=R|sin γ|.

Proceeding to step 52, routine 40 calculates the time to the closest point-of-approach ($T_{CPA}$) for this target object. The time to closest point-of-approach $T_{CPA}$ can be calculated based on range, range rate, and a calculated acceleration of the object in the radial direction. Next, in decision step 54, routine 40 determines if the following two conditions are both met: (1) is estimated miss distance less than threshold 1; and (2) is time $T_{CPA}$ less than threshold 2. If both conditions are met in step 54, routine 40 generates an output signal to provide a signal warning and/or to deploy countermeasures in step 56. The countermeasures may include pretensioning a seat belt pretensioner, providing a warning, or initiating other appropriate action. It should be appreciated that the estimated miss distance M may be used to determine if an imminent collision is anticipated or may be employed to determine if a close collision is anticipated. By estimating the closest point-of-approach time $T_{CPA}$, the time of an anticipated collision or a near collision event can be monitored and employed to timely employ any safety devices such as a seat belt pretensioner. If either one of the two above conditions is not met, routine 40 ends at step 58.

The miss distance estimation of the present invention assumes that the target object is moving straight and at a constant speed relative to the host vehicle. The target object heading (i.e., the direction of speed S) is constant, however, if the target object is not moving directly toward or away from the host vehicle, then the radial angle is changing. Hence, the miss angle γ is changing and the range rate $\dot{R}$ is changing. If exact measurements of range r and range rate $\dot{r}$ are available at time instant k and k+1, the speed of the object can be obtained. By processing the estimated speed S and measured range rate $\dot{r}$ with the Kalman filter, the miss angle γ is obtained, and then the miss distance M is calculated as a function of the range R and miss angle γ.

The non-linear extended Kalman filter inputs the sequence of measurements and, at each measurement time k, k+1, k +2, etc., estimates of the following target attributes at the initial time are updated: (1) the targeted object range R; (2) object speed S; and (3) the miss angle γ. If the initial angle and a direction of travel are known, then the target position may also be estimated as time progresses.

The estimation problem for the non-linear extended Kalman filter will now be explained. The state variables used in the extended Kalman filter are:

State Variables: R, γ, and S.

The process model for the non-linear extended Kalman filter is as follows:

Process Model:

$$R_{k+1} = \sqrt{R_k^2 + T^2 S_k^2 + 2TR_k S_k \cos\gamma_k}$$

$$\gamma_{k+1} = \gamma_k - \arcsin\left(\frac{TS_k \sin\gamma_k}{\sqrt{R_k^2 + T^2 S_k^2 + 2TR_k S_k \cos\gamma_k}}\right)$$

$$S_{k+1} = S_k$$

$R_k$ is the estimated target range at time k, $S_k$ is the estimated target relative speed at time k, $\gamma_k$ is the estimated target miss angle estimate at time k, and T is the time difference between time k and the next time instant k+1.

The measurement model for the non-linear extended Kalman filter is as follows:

Measurement Model: $r_k = R_k$ $$\dot{r}_k = S_k \cos\gamma_k$$

where $r_k$ is measured range at the current time, and $\dot{r}_k$ is the measured range rate at the current time. The miss distance calculation for the non-linear extended Kalman filter is as follows:

$$M_k = R_k |\sin(\gamma_k)|.$$

It should be appreciated that the extended Kalman filter may be designed and implemented to estimate the miss distance M to a target object by employing the state variables, the process model, and the measurement model as described above. In addition, standard models of process and measurement noises could be employed. The extended Kalman filter may be implemented in various forms such as a smoother or a non-linear filter which is based on the selection of physical quantities to be represented by state variables in the filter, the dynamic models chosen to represent the interaction and time-evolution of the state variables, and the measurement model chosen to represent how the available measurements are related to the values taken by the physical quantities represented in the state variables. The extended Kalman filter handles non-linearities in the models, particularly in the measurement model. It should be appreciated that extended Kalman filters have been employed in other automotive applications such as vehicle rollover sensing as disclosed in U.S. Pat. No. 6,002,974, entitled "VEHICLE ROLLOVER SENSING USING EXTENDED KALMAN FILTER," the disclosure of which is hereby incorporated herein by reference.

The embodiment of a linear filter estimator may be implemented as the Kalman filter that uses the following state variables.

State variables: $R^2$, $R\dot{R}$, and $S^2$.

The process model for the linear Kalman filter is as follows:

Process Model: $R_{k+1}^2 = R_k^2 + 2T(R\dot{R})_k + T^2 S_k^2$ $$(R\dot{R})_{k+1} = (R\dot{R})_k + TS_k^2$$

$$S_{k+1}^2 = S_k^2$$

The measurement model for the linear Kalman filter is as follows:

Measurement Model: $r_k^2 = R_k^2 + \sigma_R^2$ $$r_k \dot{r}_k = (R\dot{R})_k + \sigma_{R\dot{R}}$$

where $\sigma_R$ represents a variance of the range measurement noise, and $\sigma_{R\dot{R}}$ represents the covariance of the range and range rate measurement noise.

The miss distance estimation $M_k$ for the linear Kalman filter is as follows:

$$M_k = \sqrt{\max\left(0, R_k^2 - \frac{(R\dot{R})_k^2}{S_k^2}\right)}$$

The linear Kalman filter may be implemented similar to the extended Kalman filter to estimate the miss distance M of a target object 16. While the miss distance estimation of the present invention has been described in connection with a non-linear extended Kalman filter and a linear Kalman filter, it should be appreciated that the miss detection may otherwise be implemented such as by way of another filter or a smoother.

Accordingly, the collision detection system 18 and method 40 of estimating miss detection according to the present invention advantageously estimates the miss distance M of a target object without requiring the measurement of an azimuth angle of the object. As a consequence, the present invention is able to employ less complex and less expensive sensing components, thus providing cost savings. By processing the estimated miss distance M, the collision detection system advantageously estimates an anticipated collision and allows for timely responsive action to be taken.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A collision detection system comprising:
   an object detection sensor for sensing an object in a field of view and for measuring range to the object and range rate of the object; and
   a controller for estimating a miss distance of the object as a function of the measured range and range rate, wherein the controller estimates the miss distance absent an azimuth angle measurement of the object.

2. The collision detection system as defined in claim 1, wherein the controller further estimates a miss angle of the object as a function of the measured range rate, and wherein the miss distance is estimated as a function of the measured range and estimated miss angle.

3. The collision detection system as defined in claim 2, wherein the controller further estimates speed of the object, and wherein the estimated miss angle is estimated as a function of the measured range rate and estimated speed.

4. The collision detection system as defined in claim 1, wherein the sensor is located on a vehicle and the estimated miss distance of the object is relative to the vehicle.

5. The collision detection system as defined in claim 1, wherein the controller estimates the miss distance by employing a non-linear filter.

6. The collision detection system as defined in claim 1, wherein the controller estimates the miss distance by employing an extended Kalman filter.

7. The collision detection system as defined in claim 6, wherein the extended Kalman filter includes state variables comprising range, miss angle, and speed of the object.

8. The collision detection system as defined in claim 1, wherein the controller estimates the miss distance by employing a linear filter.

9. The collision detection system as defined in claim 1, wherein the controller estimates the miss distance by employing a Kalman filter.

10. The collision detection system as defined in claim 1, wherein the sensor comprises a radar sensor, wherein the range rate measurement is determined based on a Doppler effect.

11. The collision detection system as defined in claim 1, wherein the system comprises a plurality of sensors for sensing an object in a field of view.

12. The collision detection system as defined in claim 1, wherein the estimated miss distance is the estimated distance to the object at the closest point of approach to the sensor.

13. The collision detection system as defined in claim 1, wherein the controller compares the miss distance to a threshold and generates a collision output signal as a function of the comparison.

14. A collision detection system for detecting a miss distance to an object, said system comprising:
   an object detection sensor for sensing an object and measuring range to the object and range rate of the object; and
   a controller for estimating a miss angle of the object as a function of the measured range rate, said controller further estimating a miss distance of the object as a function of the measured range and the estimated miss angle.

15. The collision detection system as defined in claim 14, wherein the controller estimates the miss distance absent an azimuth angle measurement of the object.

16. The collision detection system as defined in claim 14, wherein the controller estimates the miss distance by employing a Kalman filter.

17. The collision detection system as defined in claim 14, wherein the controller estimates the miss distance by employing an extended Kalman filter.

18. The collision detection system as defined in claim 14, wherein the controller further estimates speed of the object, wherein the estimated miss angle is estimated as a function of the measured range rate and estimated speed.

19. The collision detection system as defined in claim 14, wherein the sensor is located on a vehicle and the estimated miss distance of the object is relative to the vehicle.

20. A method of estimating a miss distance of an object, said method comprising the steps of:
   sensing the presence of an object with an object detection sensor;
   tracking the object;
   measuring range to the object;
   measuring range rate of the object; and
   estimating a miss distance to the object as a function of the measured range and range rate, wherein the estimation of the miss distance is computed absent an azimuth angle measurement of the object.

21. The method as defined in claim 20 further comprising the steps of:
   estimating a miss angle of the object as a function of the measured range rate; and
   estimating the miss distance as a function of the measured range and estimated miss angle.

22. The method as defined in claim 21 further comprising the step of estimating speed of the object, wherein the estimated miss angle is estimated as a function of the measured range rate and estimated speed.

23. The method as defined in claim 20, wherein the steps of measuring range of the object and range rate of the object comprises sensing the object with a radar sensor, wherein range rate is determined based on a Doppler effect.

24. The method as defined in claim 20, wherein the miss distance estimation is relative to a vehicle.

25. The method as defined in claim 20 further comprising the step of generating an output signal indicative of a vehicle collision as a function of the miss distance.

26. The method as defined in claim 25, wherein the miss distance is compared to a threshold value, and the output signal is generated based on the comparison.

27. The method as defined in claim 20, wherein the step of estimating the miss distance comprises the use of a Kalman filter.

28. The method as defined in claim 20, wherein the step of estimating the miss distance comprises the use of an extended Kalman filter.

29. A method of estimating a miss distance of an object, said method comprising the steps of:
   sensing the presence of an object with an object detection sensor;

tracking the object;

measuring range to the object;

measuring range rate of the object;

estimating a miss angle of the object as a function of the measured range rate; and estimating a miss distance of the object as a function of the measured range and the estimated miss angle.

30. The method as defined in claim 29, wherein the step of estimating the miss distance is performed absent an azimuth angle measurement of the object.

31. The method as defined in claim 29 further comprising the step of estimating speed of the object, wherein the estimated miss angle is estimated as a function of the measured range rate and estimated speed.

32. The method as defined in claim 29, wherein the miss distance estimation is relative to a vehicle.

33. The method as defined in claim 29, wherein the step of estimating the miss distance comprises the use of a Kalman filter.

34. The method as defined in claim 29, wherein the step of estimating the miss distance comprises the use of an extended Kalman filter.

* * * * *